(12) United States Patent
Deeb et al.

(10) Patent No.: US 11,044,898 B2
(45) Date of Patent: Jun. 29, 2021

(54) HEATED FISHING ROD GUIDE APPARATUS

(71) Applicants: Walied Deeb, Ferndale, MI (US); Thomas John Sawarynski, Jr., West Broomfield, MI (US)

(72) Inventors: Walied Deeb, Ferndale, MI (US); Thomas John Sawarynski, Jr., West Broomfield, MI (US)

( * ) Notice: Subject to any disclaimer, the term of this patent is extended or adjusted under 35 U.S.C. 154(b) by 454 days.

(21) Appl. No.: 15/884,515

(22) Filed: Jan. 31, 2018

(65) Prior Publication Data

US 2018/0213758 A1   Aug. 2, 2018

Related U.S. Application Data

(60) Provisional application No. 62/452,846, filed on Jan. 31, 2017.

(51) Int. Cl.
| | |
|---|---|
| *A01K 87/04* | (2006.01) |
| *A01K 87/00* | (2006.01) |
| *A41D 19/00* | (2006.01) |
| *A01K 87/08* | (2006.01) |
| *A01K 97/10* | (2006.01) |

(52) U.S. Cl.
CPC ............ *A01K 87/04* (2013.01); *A01K 87/007* (2013.01); *A01K 87/08* (2013.01); *A01K 87/085* (2013.01); *A01K 97/10* (2013.01); *A41D 19/0024* (2013.01); *A41D 2600/106* (2013.01)

(58) Field of Classification Search
CPC .... A01K 87/04; A01K 87/007; A01K 87/085; A41D 19/0024

USPC .......................................... 43/24, 18.1 R, 25
See application file for complete search history.

(56) References Cited

U.S. PATENT DOCUMENTS

| | | | | |
|---|---|---|---|---|
| 3,164,921 | A * | 1/1965 | Mavrakis | A01K 87/085 43/24 |
| 4,598,192 | A * | 7/1986 | Garrett | A01K 87/085 126/204 |
| 5,175,953 | A * | 1/1993 | Lesnock | A01K 87/04 43/24 |
| 5,517,786 | A * | 5/1996 | Peissig | A01K 87/085 43/18.1 R |
| 5,655,328 | A * | 8/1997 | Childs | A01K 87/085 219/535 |
| 2014/0196352 | A1* | 7/2014 | Coveyou | A01K 97/12 43/17 |

(Continued)

*Primary Examiner* — Darren W Ark
*Assistant Examiner* — William L Gmoser
(74) *Attorney, Agent, or Firm* — Williams Intellectual Property; Benjamin F. Williams

(57) ABSTRACT

A heated fishing rod guide apparatus is provided to enable fishing in freezing conditions. A circuit strip overlay is positionable upon a fishing rod to situate a plurality of heating elements in heating contact with each of the plurality of guides disposed upon the fishing rod blank. Electrical energy supplied to each guide therefore resistively heats said guides to prevent the fishing line from freezing thereto to prevent snapping of the line as often otherwise occurs. At least one connector is disposed upon the handle of the fishing rod disposed in circuit with the circuit strip overlay. The at least one connector may be adapted for connection with at least one contact disposed upon a cold weather glove, to enable heating of the rod when held in hand, and, alternately, with an attachable contact to enable hands-free heating.

7 Claims, 4 Drawing Sheets

(56) References Cited

U.S. PATENT DOCUMENTS

| | | | |
|---|---|---|---|
| 2015/0106996 A1* | 4/2015 | Lau | B62J 6/16 2/160 |
| 2017/0142950 A1* | 5/2017 | Laws | A01K 97/01 |
| 2017/0325439 A1* | 11/2017 | Chapman | A01K 87/085 |
| 2017/0338610 A1* | 11/2017 | Brunnbauer | A41D 19/0024 |
| 2018/0027888 A1* | 2/2018 | Hitchen | A41D 1/005 |

* cited by examiner

HEATED FISHING ROD GUIDE APPARATUS

CROSS-REFERENCE TO RELATED APPLICATIONS

This nonprovisional application claims the benefit of provisional application No. 62/452,846 filed on Jan. 31, 2017

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of heated fishing rod guide apparatuses are known in the art. Most include circuits and heating elements permanently incorporated into a rod during manufacture, often before the rod is complete, rendering such prior art expensive, oftentimes heavy and cumbersome, whereby the look and feel of the fishing rod itself is altered. What is needed is a heated fishing rod apparatus that is additional to a fishing rod, streamlined to the rod proper, and readily and expediently integrated into the rod without altering the feel of the rod when fishing. The present heated fishing rod apparatus, therefore, includes a circuit strip overlay dispositional upon a fishing rod blank to route electrical power from a power source to each of a plurality of heating elements disposed in thermal communication with each of the fishing rod guides, whereby resistive heating of said heating elements enables conduction to said fishing rod guides, and freezing of the line to the guides is preventable. Thus line breakage, frequently problematic when fishing in freezing conditions, is avoided.

FIELD OF THE INVENTION

The present invention relates to a heated fishing rod guide apparatus that includes a circuit strip overlay addable to a fishing rod blank and devised to conduct power from a power source, when said power source is connected in circuit, to each of a plurality of heating elements disposed in thermal communication with each of the fishing rod guides. Thermal energy, produced by resistive heating, thereby prevents freezing temperatures at each of the plurality of guides. Connection of the power source in circuit with the circuit strip overlay is effective by interconnection of at least one connector and at least one contact. The at least one contact may be disposed upon a glove wearable by a user, whereby grasping of the rod effects heating of the fishing rod guides. Additionally, interconnection with at least one contact disposed upon other wearable or connectable items is contemplated, such as is effectuated by a fishing rod stand, a brace, or by magnetic or mechanical attachment, as case may be.

Power for the device may be provided by a power source ported upon the person or, in some embodiments, a power source disposed interior to the fishing rod itself. Power may likewise be generable by a solar strip disposed upon the rod or a via action of a micro alternator disposed in the fishing rod reel whereby power is generable during the act of fishing to effect thermal warming of each of the fishing rod guides and prevent freezing of the line thereagainst when fishing in freezing conditions.

SUMMARY OF THE INVENTION

The general purpose of the heated fishing rod guide apparatus, described subsequently in greater detail, is to provide a heated fishing rod guide apparatus which has many novel features that result in a heated fishing rod guide apparatus which is not anticipated, rendered obvious, suggested, or even implied by prior art, either alone or in combination thereof.

The present heated fishing rod guide apparatus has been devised to prevent line breakage when fishing in freezing conditions. The present heated fishing rod guide apparatus, therefore, enables prolonged fishing seasons and fishing in climes where temperatures fall below freezing. The present heated fishing rod guide apparatus, therefore, is effective to heat each of a plurality of guides disposed upon a fishing rod, as common in the art, whereby the line, strung through said plurality of guides, does not freeze against said guides during fishing in freezing and subzero conditions.

The present heated fishing rod guide apparatus, therefore, includes a circuit strip overlay dispositional upon a blank of a fishing rod to connect each of a plurality of heating elements, disposed in thermal communication with each of the plurality of guides, to a power source. An electrical current is thereby producible within the circuit strip overlay and resistive heating of each of the plurality of heating elements conducts thermal energy to each of the plurality of guides to prevent freezing of water thereupon.

The circuit strip overlay is contemplated to be a thin, flexible, wirelike, ductile, or comprised of another conductive material, addable to a fishing rod blank to conduct power between each of the plurality of heating elements and a power source. The circuit strip overlay may include metallic conductive elements, such as copper, silver, or gold, for example, or may be rendered of a conductive polymer. The circuit strip overlay may be printable, paintable, or sprayable onto the rod blank to enable conduction of electrical current to each of the plurality of heating elements without substantially altering the performance, look, and feel of the rod. Additionally, the circuit strip overlay may be seated into a shallow channel laser scoured into the rod.

Each of the plurality of heating elements may include a carrier attachable to each of the plurality of guides whereby each of the plurality of heating elements is attachable to an associated guide. The carriers may be adapted specifically for use with particular guides, and may be additive printed to suit particular brands and makes of fishing rods, or molded to each of said guides. Additional means of effecting attachment of the carriers and/or each of the plurality of heating elements is contemplated as part of this invention.

At least one connector is disposed proximally upon the fishing rod for connection with at least one contact whereby power is routable to the circuit strip overlay when the at least one connector and the contact are connected. In at least one embodiment contemplated as part of this disclosure, the at least one contact is disposed upon a glove, wearable by a user when grasping the rod, whereby the act of grasping and holding the fishing rod expediently enables connection of the at least one contact and the at least one connector, whereby power is routable to the circuit strip overlay by manual action at, or proximal to, the handle of the rod.

In another embodiment contemplated as part of this disclosure the at least one contact is attachable and separable from the fishing rod proper, whereby hands-free contact of the connector and contact is enabled. In some embodiments the at least one contact is directly connectable to the at least one connector, for example by clipping or magnetic means. In another embodiment of the invention, connection of the at least one contact and connector may be induced by seating of the rod into a holder, brace, carrier, or another means of securing the fishing rod during the act of fishing.

The power source may be ported on a user, stored nearby, be part of a holder or stand or other securable apparatus used for securing the rod during fishing, or disposed in the rod itself, such as, for example, in the handle, in the reel mount, or elsewhere, as case may be, and particularity allows, such as, for example, a supercapacitor in at least one of the fishing rod blanks. In at least one embodiment additional powering means are contemplated, such as photovoltaic strips disposed upon the fishing rod or upon apparel wearable by the user, to collect solar insolation thereat, and/or a micro alternator disposed in the fishing rod reel. Thus solar insolation incident the rod may enable generation of some power and/or rotation of the reel, as when reeling during the act of fishing, may generate incidental or additional power for storage or to effect heating of the plurality of heating elements.

In another embodiment contemplated as part of this invention, devised particularly for use with erectable rods, the circuit strip overlay apparatus may include a plurality of sections disposed to connect to each of the blanks comprising the erectable rod. Each of the plurality of sections may connect together in circuit by action of assembling the rod for use. Examples effecting such connection include contact pads which interlock together when the rod is assembled. Thus the circuit strip overlay may be devised to connect together as an operational single unit for use with erectable fishing rods.

The present heated fishing rod guide apparatus is contemplated to be additional to extant fishing rods, and applicable at close of manufacture. Alternately, embodiments whereby conversion of an existing fishing rod to incorporate the present heating fishing rod guide apparatus are also contemplated as part of this invention.

Fishing in subzero and freezing conditions is thereby enabled and line breakage frequented by water freezing the line to the guides is obviated.

Thus has been broadly outlined the more important features of the present heated fishing rod guide apparatus so that the detailed description thereof that follows may be better understood and in order that the present contribution to the art may be better appreciated.

For better understanding of the heated fishing rod guide apparatus, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
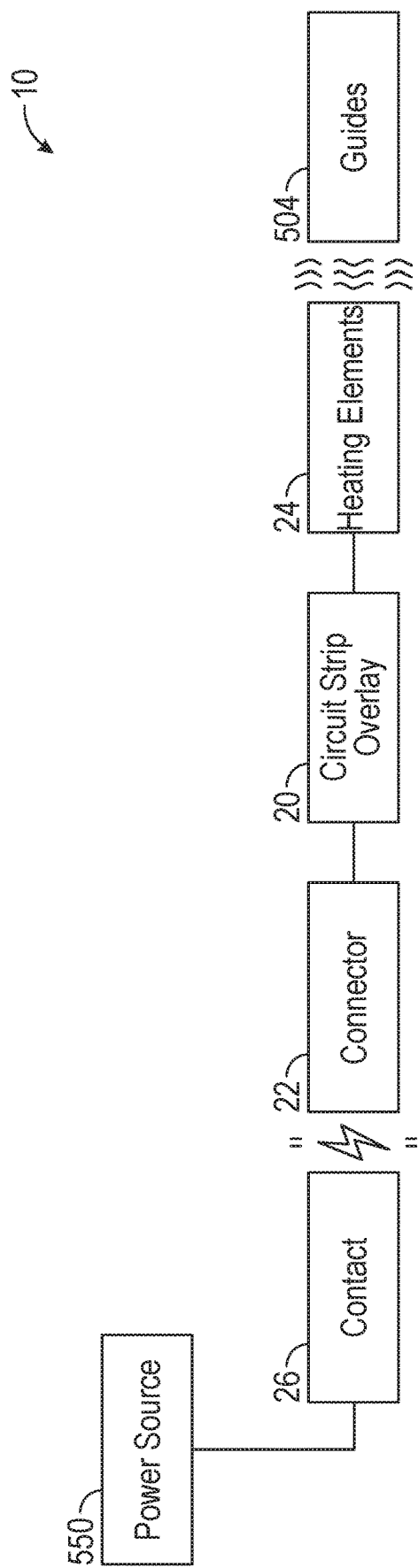
FIG. 1 is a block diagram view of an example embodiment.
Figure 2:
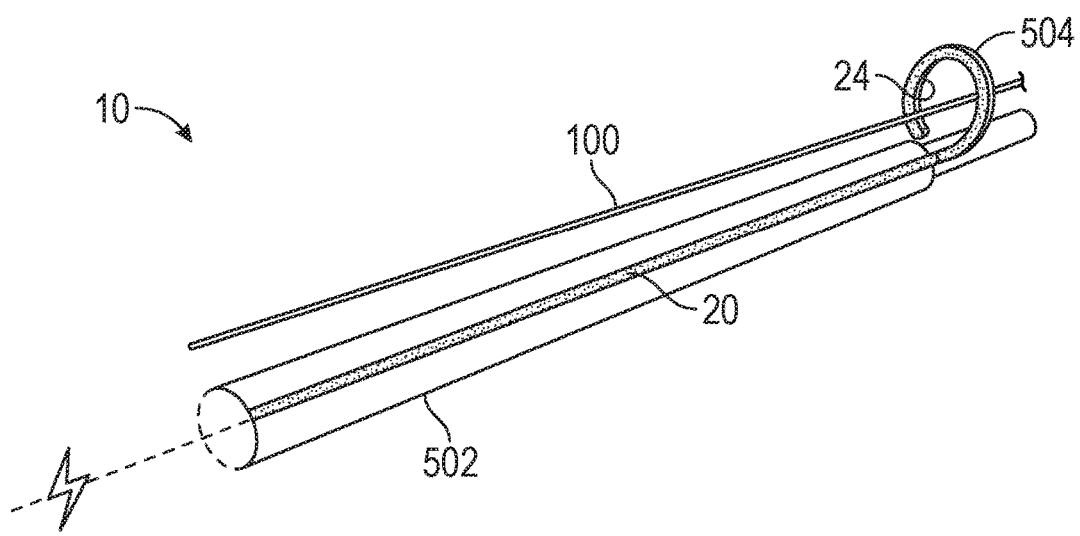
FIG. 2 is a detail view of an example embodiment illustrating a circuit strip overlay in connection with a heating element disposed in thermal communication with a guide.
Figure 3:
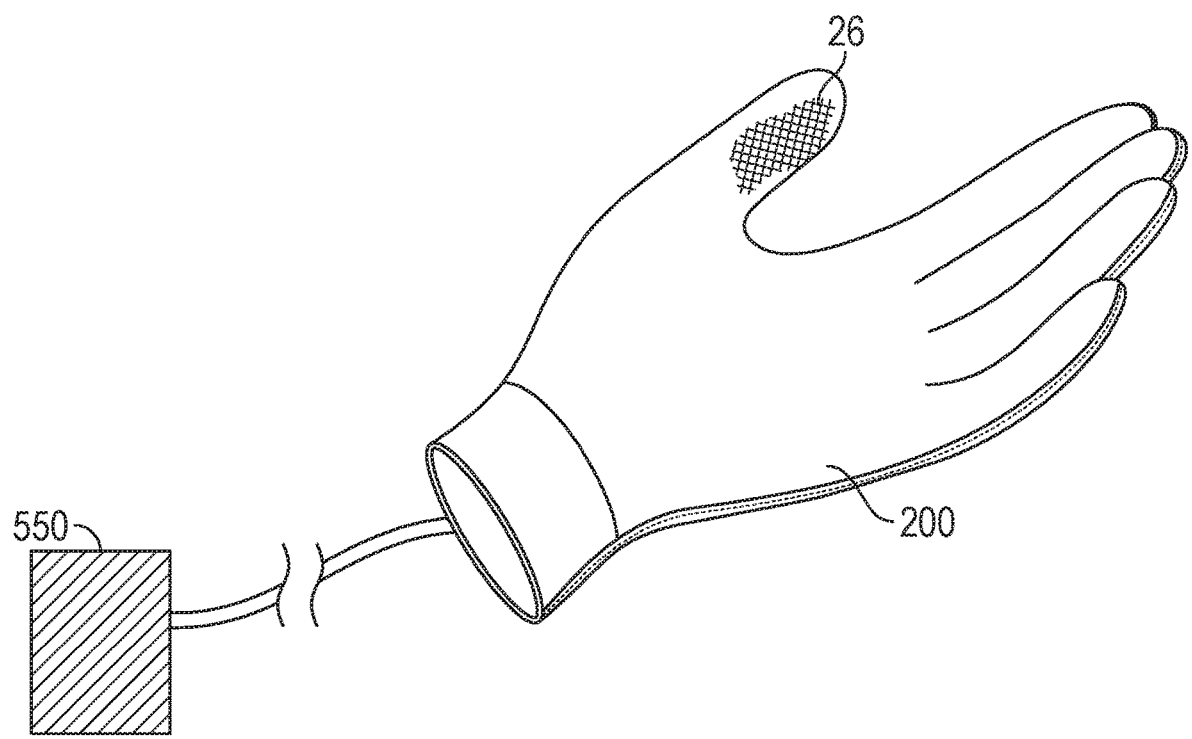
FIG. 3 is a detail view of a glove having at least one contact disposed upon a thumb for contact with at least one connector disposed upon the rod whereby power is routable to the circuit strip overlay.
Figure 4:
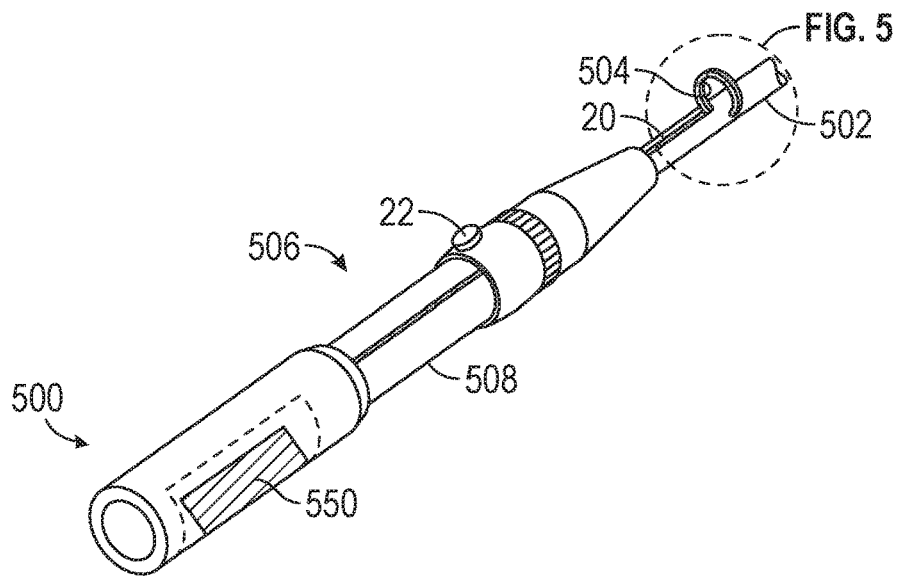
FIG. 4 is a detail view of a handle of a fishing rod having at least one connector disposed thereupon and a power source disposed in the handle.
Figure 5:
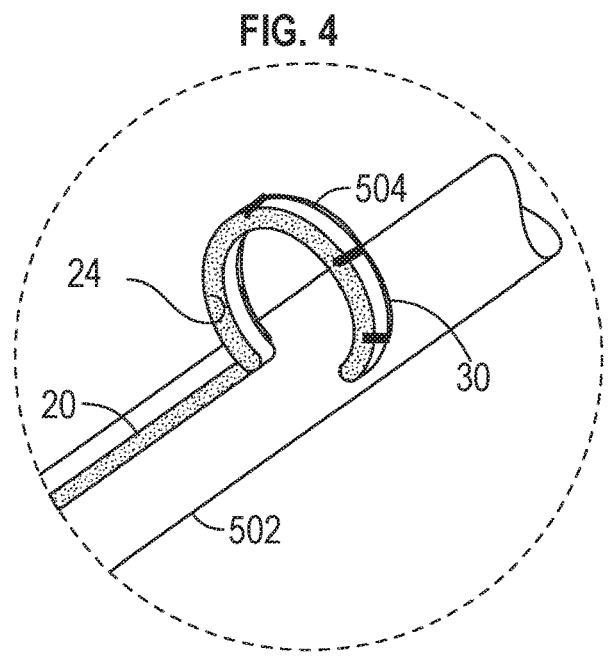
FIG. 5 is a detail view of an example embodiment of a heating element disposed in circuit with the circuit strip overlay and a fishing rod guide.
Figure 6:
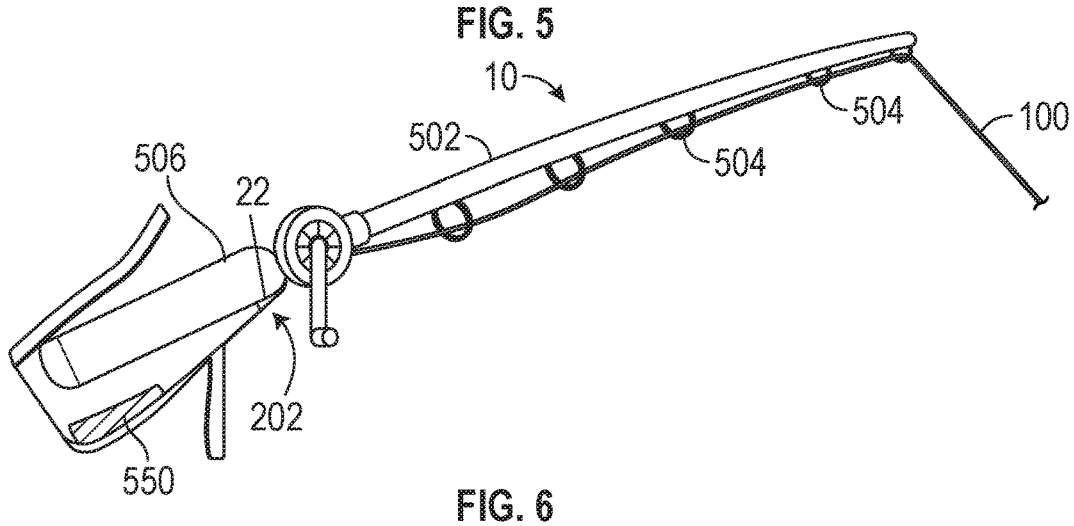
FIG. 6 is an elevation view of an example embodiment of the heated fishing rod guide apparatus disposed in a holder wherein at least one contact in the holder effects contact with at least one connector disposed upon the fishing rod handle to power the heating elements.
Figure 7:
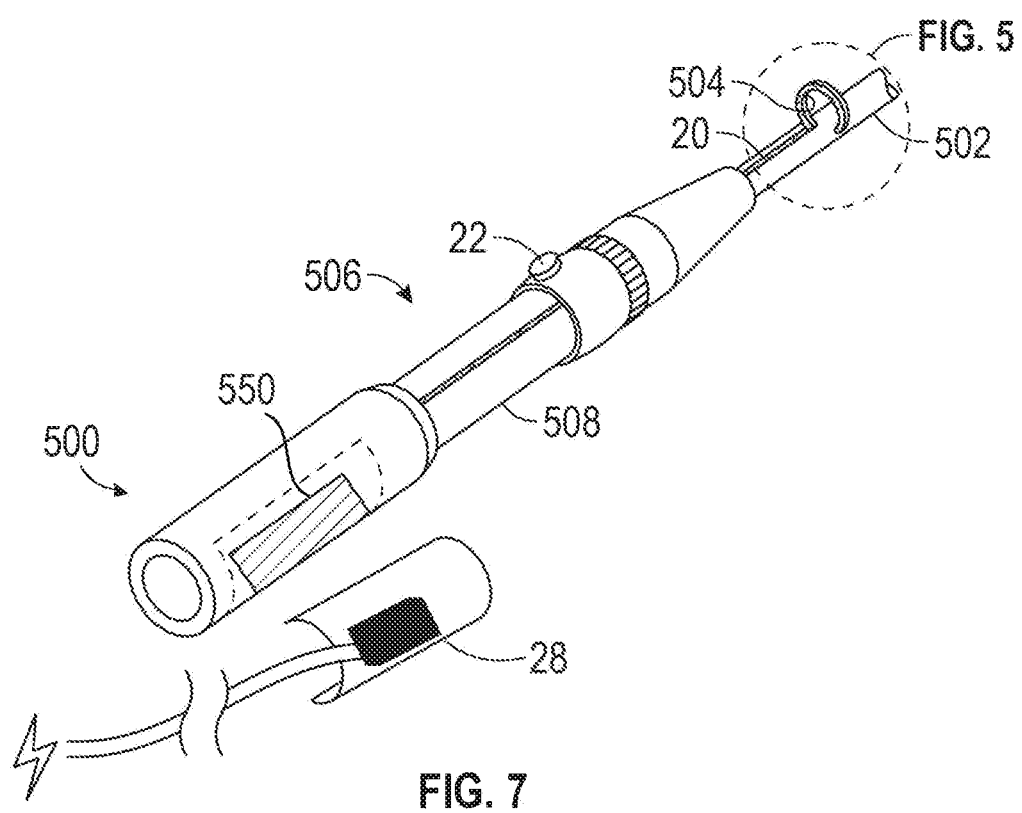
FIG. 7 is a detail view of an example embodiment of an attachable contact that directly attaches to at least one connector disposed upon the fishing rod handle.

The present heated fishing rod guide apparatus 10 has been devised to enable fishing in freezing conditions whereby the snapping of a fishing line 100 due to prolonged contact with freezing guides on a fishing rod 500 is preventable.

The present heated fishing rod guide apparatus 10, therefore, includes a thin, flexible circuit strip overlay 20 dispositional upon a blank 502 of the fishing rod 500. The circuit strip overlay 20 is positional upon the rod 500 to extend from at least one connector 22 proximally disposed upon the rod 500, along the fishing rod blank 502, to connect with each of the plurality of guides 504 disposed for stringing the line 100 from the rod 500.

Each of a plurality of heating elements 24 is disposed in circuit with the circuit strip overlay 20. Each of the plurality of heating elements 24 is operable to resistively heat each of the plurality of guides 504 when current is supplied therethrough. Electrical energy supplied to each guide 504 is therefore emanated as heat from each said guide 504, the electrical circuit disposed insulated within the circuit strip overlay 20. Each of the plurality of heating elements 24 thus communicates electrical power to heat each guide 504 and prevent freezing of the line 100 to each said guide 504 and inadvertent grounding of the circuit by contact with any of the plurality of guides 504 is obviated.

The at least one connector 22 may be disposed upon a handle 506 of the fishing rod 500 and disposed in circuit with the circuit strip overlay 20 to enable connection of the at least one connector 22 with a power source 550. The at least one connector 22 may be adapted for connection with at least one contact 26 disposed upon a cold weather glove 200, whereby grasping the handle 506 effects connection between the at least one contact 26 and the at least one connector 22. A power source 550 ported by a user, and connected in circuit with the glove 200, is thereby operable to power the instant heated fishing rod guide apparatus 10 and prevent freezing of the line 100 to any of the guides 504. Holding the rod 500 during the act of fishing thereby enables heating of the rod guides 504 whereby the line 100 is prevented from freezing to said guides 504 and fishing during freezing weather is enabled without risk of line breakage due of frozen contact with the guides 504.

The at least one connector 22 may further be disposed for connection with an attachable contact 28 that is attachable directly to said at least once connector 22. In such instances wherein fishing may be preferable without the rod 500 grasped continually in the hands of a user, connection with the attachable contact 28 may be effected by seating the rod handle 506 into a holder 202, for example. The attachable contact 28 may likewise connect directly to the at least one connector 22 by clipping or magnetic means. Additional modes of effecting connection between the at least one connector 22 and the attachable contact 28 are contemplated as part of this disclosure.

The circuit strip overlay 20 may include metals such as copper, silver, gold, or other conductive materials. The circuit strip overlay 20 is contemplated to be thin and flexible and alternately wirelike, ductile, paintable, printable, or sprayable onto the fishing rod blank 502, thereby readily additional to the rod blank 502 at time of completion of manufacture of the fishing rod 500. Additionally, attachment of the circuit strip overlay 20 after purchase by a user, to convert an existing rod 500, is also contemplated as part of this disclosure.

Insulating means is contemplated to isolate the circuit within the circuit strip overlay 20 and prevent arcing or leaking of current therefrom whereby the remainder of the rod, or its component parts, could inadvertently come live.

Each of the plurality of heating elements 24 may be housed in a seat disposed in connection with each said guide 504. Additionally, the heating element 24 may be overmolded to a surface of the guide 504 or be disposed to conduct heat into the guide 504 from a more removed situation, such as, for example, a tubular collar around the rod 500 in contact with a base of the guide 504. Circuit may be connected by soldering, conductive epoxy, metallic welds, a separable connector, a low-insertion force connector, or a wire wrap or other mechanical connection.

Each of the plurality of heating elements 24 is devised to enable heating to a minimum temperature above freezing, preferably at least 40° F., at the guide 504 where connected. Each of the plurality of heating elements 24 is contemplated to be manufactured from a material suitable for production of heat by resistance when connected in circuit. The heating elements 24 may be constructed of Negative Temperature Coefficient materials or Positive Temperature Coefficient materials. Each of the plurality of heating elements 24 may be mounted to a carrier 30 for expedient attachment to each guide 504. Each of the plurality of heating elements 24 may be created by additive printing, and thus customized for particular carriers, guides 504 and rods 500. Each of the plurality of heating elements 24 may be silkscreened to the carrier 30 or directly to the guide 504. In some embodiments, each of the plurality of heating elements 24 may be sprayed onto an associated carrier 30 or directly onto each guide 504.

Sensors may be included whereby the heated fishing rod guide apparatus 10 is rendered sensible of a threshold temperature near freezing and the temperature of each heating element 24 in circuit there disposed. Temperature may also be maintained by action of a Positive Temperature Coefficient material able to self-regulate temperature as a result of the increasing resistance of the material as the threshold temperature is approached.

The power source 550 may be sensible of lead resistance to prevent power application when resistance is sensed as too high (open circuit) or too low (dead short). The power source 550 is devised to begin supply of power to the circuit as soon as connection is made between the power source 550 and the circuit strip overlay 20. Automated heating is thus provided, absent any need of activating the circuit other than simply connecting the circuit. The power source 550 may be ported on the user or disposed proximally in the rod handle 506, a reel mount 508, or the rod blank 502, for example. Embodiments are contemplated including power generating means, such as a solar strip inlayed in the handle for generation from solar insolation or a micro alternator disposed in operational communication with the reel. The power source 550 may comprise a rechargeable cell or a supercapacitor, for example.

Embodiments are contemplated for use with multi-piece fishing rods whereby assembly of the rod 500 enables connection of the circuit to effect heating of the guides 504 when the temperature is determined at a threshold temperature. In such embodiments the circuit strip overlay 20 may include a plurality of sections, each of which plurality of sections is disposed upon a blank 502 whereby connection of the blank 502 effects completion of the circuit. Multiple means of effecting connection of the circuit during rod assembly are contemplated as part of this disclosure, including for example twist action to effect connection of a blank connector and join each of the adjacent sections of the circuit strip overlay 20 into circuit. Additional electronics may be included with the blank connector including, for example sensors and Light Emitting Diodes to signal operation and other information (such as heating, for example, or even temperature) to the user.

What is claimed is:

1. A heated fishing rod guide system, installable upon to the exterior surface of a fishing rod having a plurality of guides, said heated fishing rod guide system comprising:
   a circuit strip overlay entirely dispositional upon the exterior surface of a blank of the fishing rod;
   each of a plurality of heating elements disposed in circuit with the circuit strip overlay, each of said plurality of heating elements operable to heat each of the plurality of guides; and
   at least one connector disposed proximally upon the fishing rod, said at least one connector disposed in circuit with the circuit strip overlay, said at least one connector connectable to a power source;
   wherein each of the plurality of heating elements is heatable when the at least one connector is connected to the power source to prevent freezing of a fishing rod line to each of the plurality of guides when fishing in freezing conditions.

2. The heated fishing rod guide apparatus of claim 1 wherein the at least one connector is disposed for connection with at least one contact disposed upon a glove wearable by a user grasping the fishing rod whereby power is routable to the circuit strip overlay when the user grasps the rod.

3. The heated fishing rod guide apparatus of claim 1 wherein the at least one connector is connectable to a contact separable and attachable to the rod.

4. The heated fishing rod guide apparatus of claim 1 wherein the circuit strip overlay further comprises:
   each of a plurality of sections, each of said sections adapted to overlay each blank comprising the rod whereby assembly of the rod for fishing connects the plurality of sections in circuit.

5. The heated fishing rod guide apparatus of claim 4 further comprising each of a blank connection seat disposed to connect each of the plurality of sections when the rod is assembled.

6. The heated fishing rod guide apparatus of claim 5 wherein the at least one connector is disposed for connection with at least one contact disposed upon a cold weather glove wearable by a user grasping the fishing rod whereby power is routable to the circuit strip overlay when the user grasps the handle of the rod.

7. The heated fishing rod guide apparatus of claim 5 wherein the at least one connector is connectable to a contact separable and attachable to the rod.

* * * * *